US010620687B2

(12) United States Patent
Eastep et al.

(10) Patent No.: US 10,620,687 B2
(45) Date of Patent: Apr. 14, 2020

(54) HYBRID POWER MANAGEMENT APPROACH (71) Applicant: Intel Corporation, Santa Clara, CA (US)

(72) Inventors: Jonathan M. Eastep, Portland, OR (US); Richard J. Greco, West Linn, OR (US); Federico Ardanaz, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 199 days.

(21) Appl. No.: 14/580,180

(22) Filed: Dec. 22, 2014

(65) Prior Publication Data

US 2016/0179156 A1 Jun. 23, 2016

(51) Int. Cl.
G06F 1/324 (2019.01)
G06F 1/3234 (2019.01)
G06F 1/3296 (2019.01)

(52) U.S. Cl.
CPC ............ G06F 1/324 (2013.01); G06F 1/3243 (2013.01); G06F 1/3296 (2013.01); Y02D 10/126 (2018.01); Y02D 10/152 (2018.01); Y02D 10/172 (2018.01)

(58) Field of Classification Search
CPC ....... G06F 1/324; G06F 1/3243; G06F 1/3296
USPC ........................................................ 713/300
See application file for complete search history.

(56) References Cited

U.S. PATENT DOCUMENTS 4,858,117 A * 8/1989 DiChiara et al. ....... G06F 13/12
711/208
5,596,755 A * 1/1997 Pletcher et al. .......... G06F 9/46
710/261
5,964,879 A 10/1999 Dunstan et al.
6,064,811 A * 5/2000 Spilo et al. ............. G06F 12/02
718/104
6,442,699 B1 8/2002 Nakajima
7,509,391 B1 * 3/2009 Chauvel .............. G06F 12/1027
709/213
8,099,777 B1 * 1/2012 Maxted ..................... G06F 7/04
726/14
8,826,367 B2 9/2014 Srivastava et al.
8,839,006 B2 9/2014 Li et al.
(Continued)

FOREIGN PATENT DOCUMENTS

WO 2016/105646 A1 6/2016

OTHER PUBLICATIONS

"CPI Power Management Tool", Product Data Sheet, 2014, 3 pages, Chatsworth Products Inc.
(Continued)

Primary Examiner — Jaweed A Abbaszadeh
Assistant Examiner — Sumil M Desai
(74) Attorney, Agent, or Firm — Spectrum IP Law Group LLC (57) ABSTRACT Methods and apparatus to provide a hybrid power management approach are described. Some embodiments redefine the interface to Power Control Unit (PCU) allowing a hybrid implementation where software running on CPU (Central Processing Unit, also referred to herein interchangeably as "processor") cores performs more of the work for power management, enabling the PCU to remain as a simple or regular microcontroller. Other embodiments are also disclosed and claimed.

26 Claims, 5 Drawing Sheets

(56) References Cited

U.S. PATENT DOCUMENTS

| | | |
|---|---|---|
| 2006/0218423 A1 | 9/2006 | Diefenbaugh et al. |
| 2006/0294400 A1 | 12/2006 | Diefenbaugh et al. |
| 2008/0301474 A1 | 12/2008 | Bussa et al. |
| 2009/0171511 A1* | 7/2009 | Tolentino ............... G06F 1/266 700/297 |
| 2011/0138195 A1 | 6/2011 | Kim et al. |
| 2012/0047383 A1* | 2/2012 | Laor ..................... G06F 1/3287 713/324 |
| 2012/0084028 A1 | 4/2012 | Kumar et al. |
| 2012/0185706 A1 | 7/2012 | Sistla et al. |
| 2012/0260117 A1 | 10/2012 | Acar et al. |
| 2013/0007494 A1* | 1/2013 | Branover .............. G06F 1/3203 713/323 |
| 2013/0061064 A1 | 3/2013 | Ananthakrishnan et al. |
| 2013/0080796 A1 | 3/2013 | Matsubara et al. |
| 2013/0111425 A1 | 5/2013 | Kumar et al. |
| 2013/0318334 A1 | 11/2013 | Waskiewicz, Jr. |
| 2014/0067139 A1 | 3/2014 | Berke et al. |
| 2014/0082377 A1 | 3/2014 | Dinh et al. |
| 2014/0082380 A1 | 3/2014 | Schluessler et al. |
| 2014/0181545 A1 | 6/2014 | Shrall et al. |
| 2014/0181553 A1 | 6/2014 | Eckert et al. |
| 2014/0189398 A1 | 7/2014 | Gorbatov et al. |
| 2014/0379921 A1 | 12/2014 | Morley et al. |
| 2015/0007356 A1* | 1/2015 | Hauke .................... G06F 21/81 726/36 |
| 2015/0058641 A1 | 2/2015 | Parikh |
| 2015/0177798 A1 | 6/2015 | Venishetti et al. |
| 2016/0147280 A1 | 5/2016 | Thomas et al. |
| 2016/0170462 A1 | 6/2016 | Shanmuganathan et al. |
| 2016/0179117 A1 | 6/2016 | Eastep et al. |
| 2016/0179157 A1 | 6/2016 | Ardanaz et al. |
| 2016/0179173 A1 | 6/2016 | Eastep et al. |
| 2016/0291671 A1* | 10/2016 | Rider .................. H02J 13/0006 |

OTHER PUBLICATIONS

International Search Report and Written Opinion received for International Application No. PCT/US2015/055353, dated Feb. 24, 2016, 14 pages.

Office Action received for U.S. Appl. No. 14/581,885, dated Oct. 6, 2016, 15 pages.

Office Action received for U.S. Appl. No. 14/581,854, dated Aug. 25, 2016, 9 pages.

* cited by examiner

HYBRID POWER MANAGEMENT APPROACH

FIELD

The present disclosure generally relates to the field of electronics. More particularly, some embodiments generally relate to a hybrid power management approach.

BACKGROUND

Historically power management in a CPU (Central Processing Unit) started with bringing the CPU in and out of various sleep states (e.g., ACPI S-states and C-states), and controlling processor voltage and frequency (e.g., ACPI P-states). The CPU performs these actions at the request of power management software running on CPU cores. Common to all of these is the need to stop, wake-up, or suspend the operation of the CPU cores to perform the desired operation. Because the cores cannot be used, these operations happen on a microcontroller, commonly called the Power Control Unit or PCU. As power management has become more sophisticated, implementations have continued to use the PCU to implement all of power management merely because a portion of the management requires the use of a microcontroller. However, as power management has become more sophisticated due to features and increased core counts, a single microcontroller lacks the resources to implement power management forcing more expensive solutions like distributed microcontrollers.

BRIEF DESCRIPTION OF THE DRAWINGS

The detailed description is provided with reference to the accompanying figures. In the figures, the left-most digit(s) of a reference number identifies the figure in which the reference number first appears. The use of the same reference numbers in different figures indicates similar or identical items.

DETAILED DESCRIPTION

In the following description, numerous specific details are set forth in order to provide a thorough understanding of various embodiments. However, various embodiments may be practiced without the specific details. In other instances, well-known methods, procedures, components, and circuits have not been described in detail so as not to obscure the particular embodiments. Further, various aspects of embodiments may be performed using various means, such as integrated semiconductor circuits ("hardware"), computer-readable instructions organized into one or more programs ("software"), or some combination of hardware and software. For the purposes of this disclosure reference to "logic" shall mean either hardware, software, or some combination thereof.

As mentioned above, Historically power management in a CPU (Central Processing Unit) started with bringing the CPU in and out of various sleep states (e.g., ACPI S-states and C-states), and controlling processor voltage and frequency (e.g., ACPI P-states). The CPU performs these actions at the request of power management software running on CPU cores. Common to all of these is the need to stop, wake-up, or suspend the operation of the CPU cores to perform the desired operation. Because the cores cannot be used, these operations happen on a microcontroller, commonly called the Power Control Unit or PCU. As power management has become more sophisticated, implementations have continued to use the PCU to implement all of power management merely because a portion of the management requires the use of a microcontroller. However, as power management has become more sophisticated due to features and increased core counts, a single microcontroller lacks the resources to implement power management forcing more expensive solutions like distributed microcontrollers.

To this end, some embodiments redefine the interface to the PCU allowing a hybrid implementation where software running on CPU (also referred to herein interchangeably as "processor") cores performs more of the work for power management, enabling the PCU to remain a simple/regular microcontroller. In addition to cost, extremely sophisticated power management such as whole cluster power management across tens of thousands of nodes (attractive in markets like High Performance Computing and Cloud Computing) is more naturally implemented using this approach. Additionally, the firmware to program the microcontroller is difficult to write and debug. By moving power management work to a software environment on the CPU cores, the rich programming and debugging environments available for CPU cores will reduce the time and costs associated with developing power management.

Figure 1:
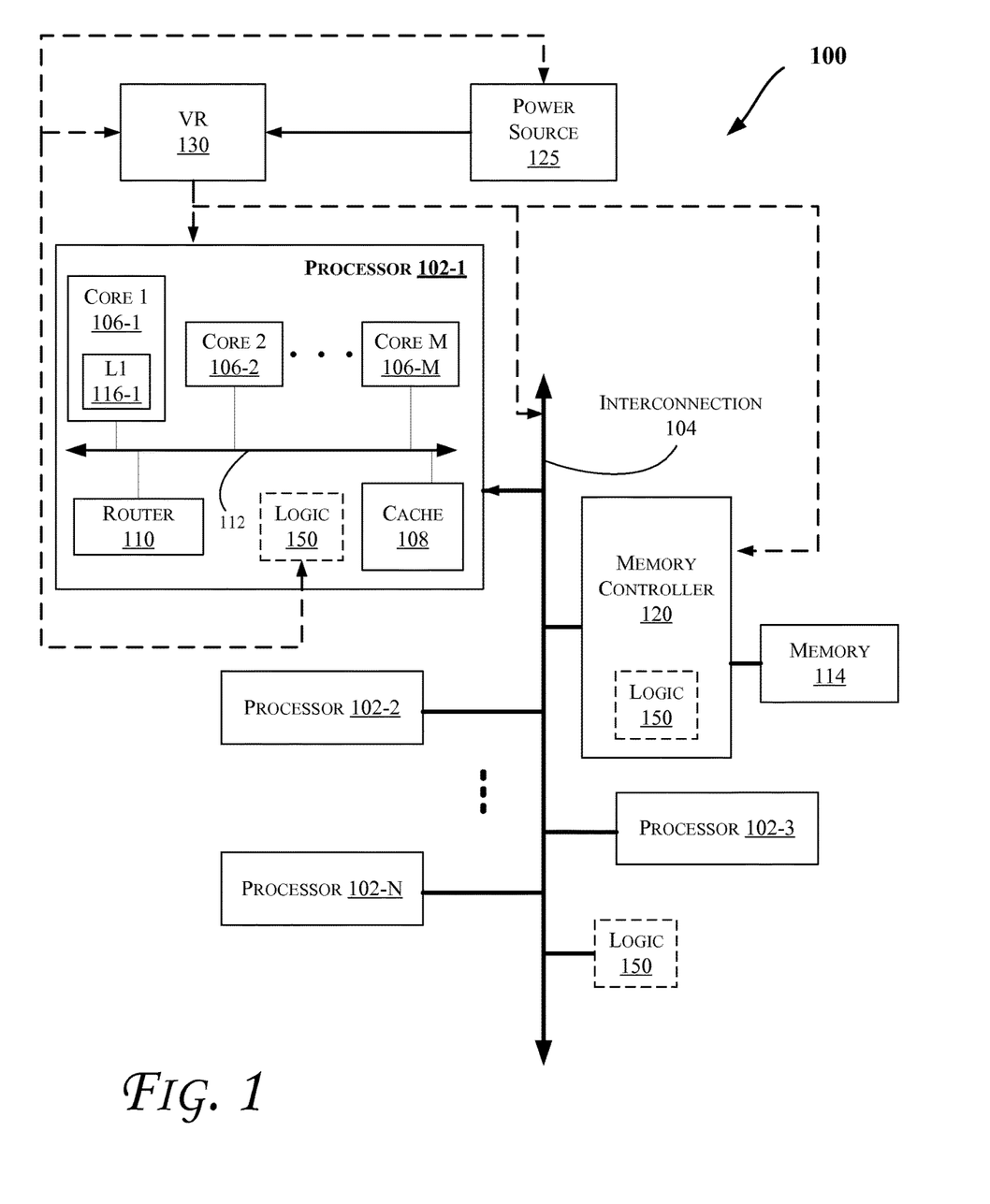
FIGS. 1 and 3-5 illustrate block diagrams of various computing systems, according to some embodiments.

Moreover, the techniques discussed herein may be provided in various computing systems (e.g., including a non-mobile computing device such as a desktop, workstation, server, rack system, etc. and a mobile computing device such as a smartphone, tablet, UMPC (Ultra-Mobile Personal Computer), laptop computer, Ultrabook™ computing device, smart watch, smart glasses, etc.), including those discussed with reference to FIGS. 1-5. More particularly, FIG. 1 illustrates a block diagram of a computing system 100, according to an embodiment. FIG. 1 is a schematic representation and not meant to reflect physical organization. The system 100 includes one or more processors 102-1 through 102-N (generally referred to herein as "processors 102" or "processor 102"). The processors 102 may communicate via an interconnection (or fabric) 104. There is also a possibility that one or more processors can share a connection to the interconnect or fabric. Each processor may include various components some of which are only discussed with reference to processor 102-1 for clarity. Accordingly, each of the remaining processors 102-2 through 102-N may include the same or similar components discussed with reference to the processor 102-1.

In an embodiment, the processor 102-1 may include one or more processor cores 106-1 through 106-M (referred to herein as "cores 106," or more generally as "core 106"), a cache 108 (which may be a shared cache or a private cache in various embodiments), and/or a router 110. The processor cores 106 may be implemented on a single integrated circuit (IC) chip. This may also be implemented with multiple integrated circuits in the same package. Moreover, the chip may include one or more shared and/or private caches (such as cache 108), buses or interconnections (such as a bus or interconnection 112), logic 150, memory controllers such as those discussed with reference to FIGS. 3-5 (including NVM (Non-Volatile Memory), for example, flash memory, an SSD (Solid State Drive), etc.), or other components. In other embodiments, components of FIG. 1 may be arranged in different ways, e.g., the VR, memory controller, and main memory may be inside the processor while the router may be outside of the processor.

In one embodiment, the router 110 may be used to communicate between various components of the processor 102-1 and/or system 100. Moreover, the processor 102-1 may include more than one router 110. Furthermore, the multitude of routers 110 may be in communication to enable data routing between various components inside or outside of the processor 102-1. In some embodiments, when there are a multitude of routers, some could be inside the processor and some could be outside.

The cache 108 may store data (e.g., including instructions) that are utilized by one or more components of the processor 102-1, such as the cores 106. For example, the cache 108 may locally cache data stored in (volatile and/or non-volatile) memory 114 (also referred to herein interchangeably as "main memory") for faster access by the components of the processor 102. As shown in FIG. 1, the memory 114 may be in communication with the processors 102 via the interconnection 104. In an embodiment, the cache 108 (that may be shared) may have various levels, for example, the cache 108 may be a mid-level cache and/or a last-level cache (LLC) (such as L1 and/or L2 caches). Also, each of the cores 106 may include a level 1 (L1) cache (116-1) (generally referred to herein as "L1 cache 116"). Various components of the processor 102-1 may communicate with the cache 108 directly, through a bus or fabric (e.g., the bus 112), and/or a memory controller or hub.

The system 100 may also include a (e.g., platform) power source 125 (e.g., a Direct Current (DC) power source or an Alternating Current (AC) power source) to provide power to one or more components of the system 100. The power source 125 could include a PV (Photo Voltaic) panel, wind generator, thermal generator water/hydro turbine, etc. In some embodiments, the power source 125 may include one or more battery packs (e.g., charged by one or more of a PV panel, wind generator, thermal generator water/hydro turbine, plug-in power supply (for example, coupled to an AC power grid), etc.) and/or plug-in power supplies.

The power source 125 may be coupled to components of system 100 through a Voltage Regulator (VR) 130. Moreover, even though FIG. 1 illustrates one power source 125 and a single voltage regulator 130, additional power sources and/or voltage regulators may be utilized. For example, one or more of the processors 102 may have corresponding voltage regulator(s) and/or power source(s). Also, the voltage regulator(s) 130 may be coupled to the processor 102 via a single power plane (e.g., supplying power to all the cores 106) or multiple power planes (e.g., where each power plane may supply power to a different core or group of cores, and/or other component(s) of the system 100). Additionally, while FIG. 1 illustrates the power source 125 and the voltage regulator 130 as separate components, the power source 125 and the voltage regulator 130 may be incorporated into other components of system 100. For example, all or portions of the VR 130 may be incorporated into the power source 125, an SOC (such as those discussed with reference to FIG. 6), and/or processor 102.

As shown in FIG. 1, memory 114 may be coupled to other components of system 100 through memory controller 120. System 100 also includes logic 150 to facilitate and/or perform one or more operations with reference to power management techniques/embodiments as discussed herein. For example, logic 150 may perform operation(s) corresponding to deciding policy, enforcing policy, or performing other power management functions in one or more compute nodes and/or components of system 100 (including for example, processor 102, memory controller 120, memory 114 (also referred to herein sometimes as "external memory"), caches 116 or 108, and/or interconnection or fabric(s) 104 and/or 112, etc.). Moreover, even though logic 150 is shown in several optional locations in system 100, the logic 150 may be located elsewhere in system 100. In an embodiment, logic 150 includes a Power Control Unit (PCU) and/or Memory Management Unit (MMU), e.g., including firmware or software to operate a PCU and/or MMU.

Moreover, one goal of power management is to manage to some objective function such as highest performance within a power budget, best energy efficiency, lowest power consumption, etc. Some embodiments separate the functionality implemented on a PCU today into "policy" and "enforcement". The "policy" portion will contain all the functionality of the PCU that is currently involved in making the decisions associated with managing to the objective function. The "enforcement" portion contains a set of what to do, and catastrophic thermal and power cap decisions. By defining an interface between "policy" and "enforcement" we can migrate anything in the "policy" portion to software running on a CPU.

Moreover, to make power management software portable across multiple generations of hardware, the industry has developed and adopted an industry standard interface for power management, the ACPI interface (e.g., in accordance with Advanced Configuration and Power Interface (ACPI) specification, revision 5.0a, Nov. 13, 2013). Within the shrink wrapped x86/x64 ecosystem, all CPUs provide a hardware and microcode interface implementing this functionality. In some cases where the CPU is augmented by another "processor", like the use of a Baseboard Management Controller (BMC) for Clocks Per Instruction (CPI) related power management decisions, the Operating System (O/S or OS) power management request is handed over to this secondary "processor" by the PCU, and a revised request is determined by the secondary "processor" which is sent to the PCU (but the PCU still goes through all the evaluation it would normally perform for a direct O/S request).

In some embodiments, the separation of "policy" and "enforcement" gains the following benefits over existing approaches:

1. Decisions are streamlined, not duplicated, because the roles of "policy" and "enforcement" layers are well defined so each layer knows its responsibilities;

2. Because a CPU core has more resources than a microcontroller (like a regular PCU), moving the policy layer to a processor core allows more sophisticated power management policies and decisions like per core Running Average Power Limit (RAPL) management, and extensions to whole cluster power management;

3. The richer software development and debug environment for the CPU cores makes it easier to develop power management features than writing microcode for a PCU microcontroller. This returns two benefits: reduced cost, and the ability to write more sophisticated power management features; and/or 4. Software development freeze dates are later in the development cycle, and are more easily deployed as an in the field update for both improving power management or fixing errata or bugs with power management.

Software portability across generations of hardware can still be maintained by a reasonable balance of architectural and model specific interfaces (such as Model Specific Registers (MSRs) and/or shared memory based interface) in some embodiments.

Generally, hybrid software/hardware power management embodiments discussed herein simplify debugging of new power management strategies by enabling software running on a regular core to take on some of the power management functions that have historically been done by the hardware in embedded PCU microcontroller firmware. In software running on a regular core, standard debugging and compilers can be used. Furthermore, exporting certain functionality to software makes it possible to implement sophisticated power management schemes that require more computational resources than the PCU can provide.

Also, hybrid software/hardware power management embodiments coordinate software and hardware power management efforts by defining a policy vs. enforcement abstraction that: (a) enables software to guide the hardware to better power management decisions incorporating application-level information while simultaneously; (b) not relying on software to safeguard against thermal or other emergencies; and (c) not requiring software to perform time-critical functions that are better performed in hardware. Instead, the policy vs. enforcement abstraction enables software to influence performance and power decisions at coarser time scales while letting the hardware enforce those policies and failsafes at fine-grained timescales.

An embodiment provides a mechanism enabling effective hybrid software/hardware power management. The mechanism enables communication between the software and hardware, allowing the hardware to export policy controls to the software and allowing the software to communicate (e.g., frequent) policy changes to the hardware. The mechanism minimizes the hardware legacy that is maintained from one processor generation to the next; the mechanism is extensible to allow for easy experimentation with new policies and mechanisms in a given processor, across product models, and across processor product lines; the mechanism is scalable and low-overhead to support frequent policy adaptations by the software; the mechanism permits software policy to be overridden by hardware in the case of an invalid setting or an emergency while ensuring that the software is notified of the policy override; and finally, the mechanism supports exposing policies to a mix of privileged and unprivileged software code enabling unprivileged application software to play a role in power management if desired.

Figure 2:
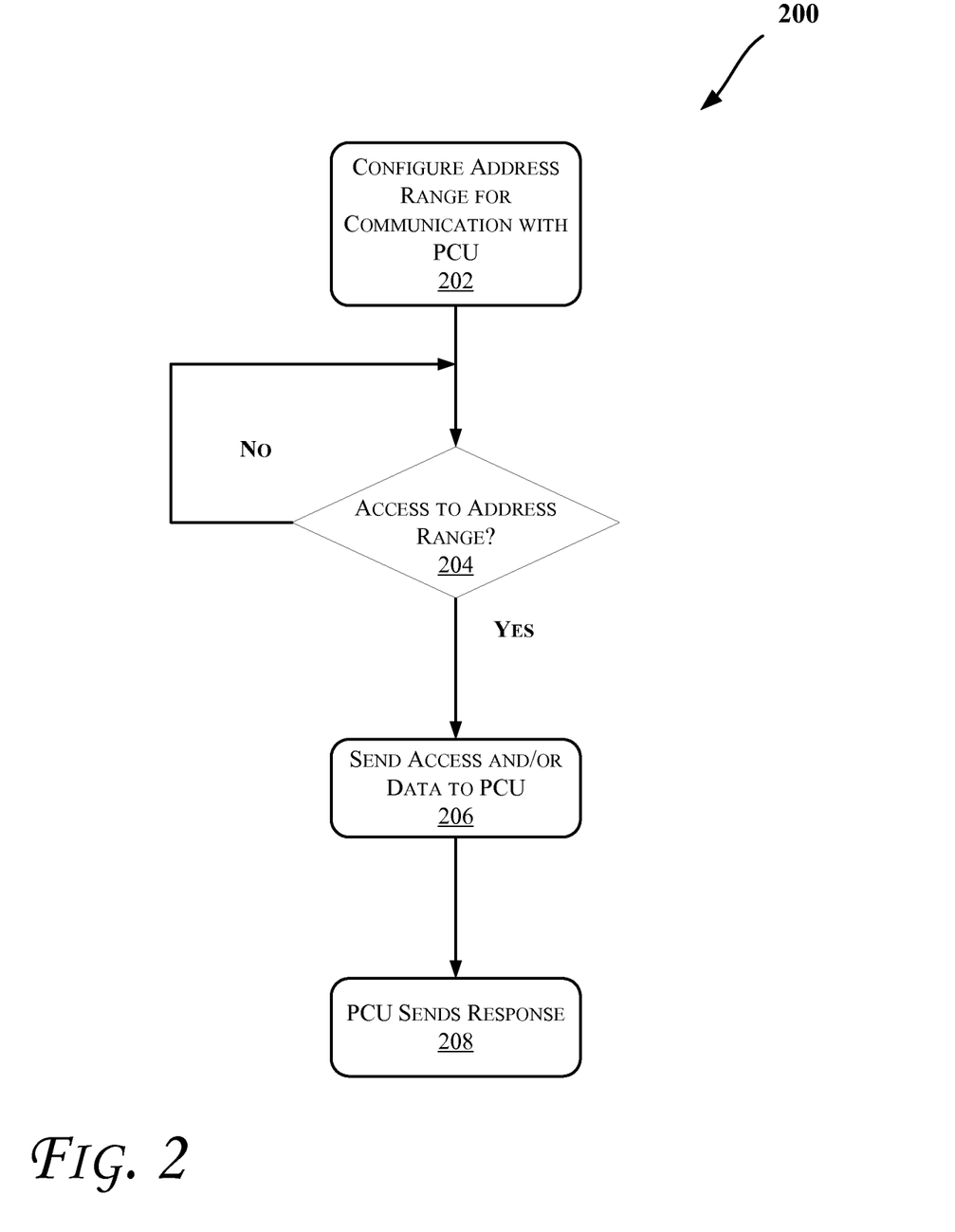
FIG. 2 illustrates a flow diagram of a method to provide a hybrid power management, according to an embodiment.

FIG. 2 illustrates a flow diagram of a method 200 to provide a hybrid power management, according to an embodiment. In one embodiment, various components discussed with reference to FIGS. 1 and 3-5 may be utilized to perform one or more of the operations discussed with reference to FIG. 2. In an embodiment, one or more operations of method 200 are implemented in logic (e.g., firmware), such as logic 150 discussed with reference to the other figures.

Referring to FIGS. 1-2, operation 202 configures/reserves an address range in the software's virtual address space which will be handled specially for communication with the PCU logic. This address range will be the home of policy and other information that software can write or read. This data is readable and writeable by the PCU as well. To enable both software and the PCU to access this data, memory-mapped Input/output (IO or I/O) is combined with modifications to the Memory Management Unit (MMU) or memory controller (or other hardware agent) and the core.

At operation 204, when software performs a load or store to an address in the reserved range, the modified MMU (or other hardware agent) intercepts these accesses and sends a message to the PCU, marshaling an access request and data (if required) to the PCU at operation 206. The physical storage for the policies and other data is located either in the PCU or in physical memory (such as those discussed herein with reference to FIGS. 1 and 3-5), so after the PCU has received an access request, it writes data or reads data (locally or in physical memory) and sends a reply message back to the requesting core at operation 208. The reply acknowledges that the access was processed and marshals policy or other data if it was requested. The PCU microcontroller runs firmware that checks for and processes access requests, reads policy settings supplied by the software, and (based on the policy) decides how to configure low-level performance and power mechanisms in the processor at fine timescales to enforce the policy.

The software and PCU firmware agree upon a policy map. The policy map defines what policy controls are supported and maps each policy to a different offset within the reserved address range. Policies are not required to be word-sized and word-aligned, but one implementation is to make them so. Thus, to read or write the value for a given policy, the software reads or writes memory at the address location prescribed for the given policy.

In a small twist on the description above, an embodiment actually utilizes two separate reserved address ranges. One range is for policies that are writeable by ring3 software (e.g., an agent with ring3 security access). One range is for policies that are only writeable by ring0 software (e.g., an agent with ring0 security access). One embodiment adds two pairs of comparators to the logic in the MMU (or other agent) in each core to detect when software has accessed an address in either reserved range. When the MMU (or other agent) detects an access to either of the reserved address ranges, we utilize modifications in the core which couple the MMU to a bus so that the MMU can exchange messages with the PCU.

Sending messages between the MMU and PCU can be handled in one of several ways. One method is to modify the core to add wires and bus arbitration enabling the MMU to route the message through an existing power management bus. If no suitable pre-existing bus is present, a new bus can be added. The new bus can be narrow and low-bandwidth to minimize implementation costs. Alternatively, a point-to-point link may be used.

Some embodiments provide a policy map is defined by the PCU firmware. If the policy map is modified from one version of the firmware to the next (or from one processor model to the next), the software for guiding policy is maintained and updated to support the new policy map. There are many ways to enable software to check the firmware version and support different firmware versions or different processor models. One method is to add a new CPUID (CPU Identifier) leaf specifying the PCU firmware version or any globally unique identifier distinguishing policy maps. Another method is to reserve the first location in the policy map and use it as the globally unique identifier. Once the identifier is known, the software can look up the identifier in a table or database and retrieve information about the policy map. The table or data-base can be maintained in the software or kept externally.

Software, the PCU firmware, the OS, and the page tables need to agree on the physical address ranges that will be reserved and assigned to the PCU for communication with software. There are several methods for ensuring agreement.

One method is to utilize an OS driver. This driver works with the OS to decide the physical address ranges then publishes them to model specific registers accessible by the PCU. Software is notified as follows. The driver exposes an interface to software enabling software to initiate mapping the physical addresses into the software's virtual address space. When software asks for it (through the driver interface), the driver maps the physical addresses into the page table and returns to software an associated virtual address.

It is not required, but one way to minimize implementation complexity is to align the reserved address ranges to page boundaries and size the ranges to a non-zero integral number of pages. There are various ways to decide the sizes of the reserved address ranges. One method is to reserve a fixed amount of space—enough space to allow for growth in size of policy maps for the foreseeable future. Another method is to perform a handshake between the driver and PCU to determine the required size.

Recall that one reserved address range may permit ring3 software to write policy while the other only may permit ring0 software to write policy. The driver configures protections for each address range when mapping the physical pages into the page table.

In the case of an emergency or an invalid policy configuration, the hardware will override the software policy setting. There are many ways to implement the policy override. The PCU can perform a bounds check of software policy settings to make sure they fall within the allowable range and within the bounds of dynamic thermal or other limitations. When an override of software policy occurs, it is critical for correctness and stability of the software algorithms that they receive notification of the override.

There are many ways to notify the software that an override has occurred. One method is for the hardware to overwrite the policy value written by software with the actual value used by the hardware after the override. When software sees a discrepancy between the policy value it set and the value used, the software can infer that an override occurred. Furthermore, software may obtain some useful information about how to avoid future overrides by examining the value that the hardware actually used after the override. Software will also need to know when the override occurred. There are several ways to implement this. One method is to define a time stamp per policy that the PCU writes when it performs an override of that policy.

As for use cases, a few examples of how hybrid software/hardware power management can be applied. The application of embodiments discussed herein are not limited to these examples, they are provided to show the flexibility and sophistication of decisions that become practical using effective hybrid software/hardware power management and the mechanism to enable it.

One of the roles of the PCU is to determine when to turbo cores within the socket. Because it is a microcontroller, the PCU will apply a strategy to make this determination and it is generally based on core activity, available power headroom, available thermal headroom, and caps on turbo frequency set by the power manager. For all this, the best the PCU can do is determine that Turbo is possible now, and some cores will be increased in frequency. Increasing voltage and frequency requires a small time scale for decisions to keep the cores in a safe operating range, a time scale that software could never meet. However with its greater computational power software can examine the behaviors of all cores, maintain long application history, and identify not just that turbo is possible, but also determine whether to turbo now or save the headroom because waiting would allow a larger turbo boost that was more beneficial to the application. A policy map for this could identify specific cores that should receive a turbo boost, and criteria for when to turbo such as when the number of active cores falls below a limit.

The PCU also is responsible for making power budgeting decisions within the socket: how much power is given to memory, cores, ODI (On-Die Interconnect), etc. Some mechanism may be provided to allow software to give hints to the PCU to steer these decisions. In interpreting these hints the PCU needs to manage to aggregated or averaged characteristics for structures within the socket. Moving this decision to software on a higher performing core again lets us apply long history, make power decisions on finer grained structures (e.g., per core power control), and other advanced power management techniques. A policy map is defined with the constraints the PCU should manage to, and by making only constraint-based decisions the PCU manages to a complex power management strategy.

These use-case examples can be merged to create even more sophisticated use-cases. In these two examples, the first one established constraints of when to turbo by specifying which cores to turbo when the number of active cores falls below a certain level. The second one assigned fine grain power budgets to structures within the socket including per core power budgets. Applying both sets of constraints at the same time gives control over which cores turbo when, that is additionally constrained by a power budget. In doing this we have moved the complexity around power management to software which makes the complex decisions, and then provides a set of constraints to the PCU which by managing to those constraints implements a complex power management strategy that could not be implemented on the PCU.

Vendors in the server segment could use the same or similar ideas for their server products as a differentiation factor enabling better peak performance and energy efficiency through better power management. In one embodiment, hybrid software/hardware power management is one of several techniques created to solve the problems associated with power management in Exascale computer. This system will be severely power constrained, and to make this system possible, it will be critical to enable power management that is more sophisticated and less difficult to develop in accordance with some embodiments. Such embodiments enable HPC or server products to expose a more effective power management interface to customers, enhancing processor power and performance control capabilities. These improvements will translate into both higher energy efficiency and higher peak performance while executing customer workloads.

Figure 3:
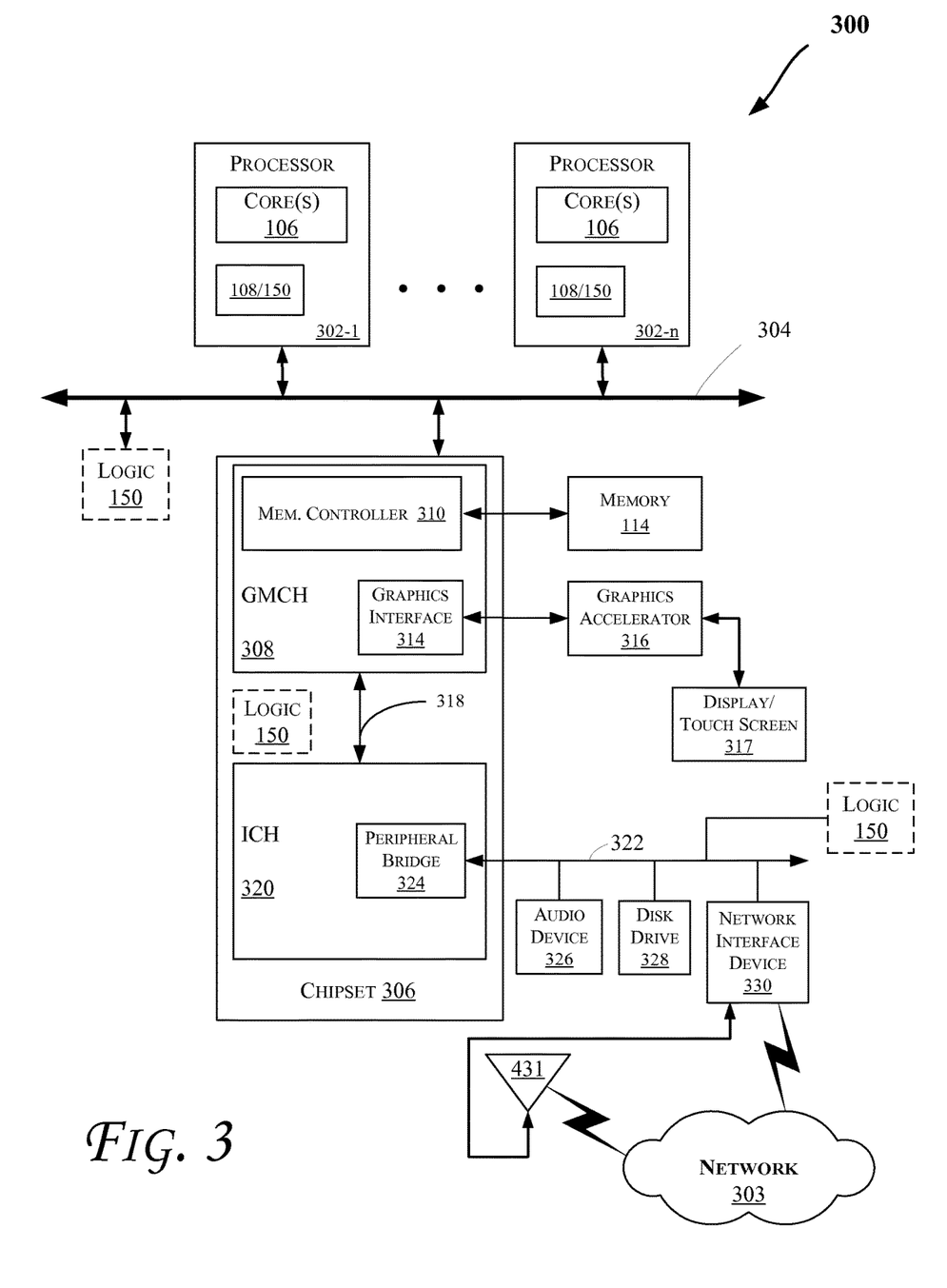

FIG. 3 illustrates a block diagram of a computing system 300 in accordance with an embodiment. The computing system 300 may include one or more central processing unit(s) (CPUs) 302 or processors that communicate via an interconnection network (or bus) 304. The processors 302 may include a general purpose processor, a network processor (that processes data communicated over a computer network 303), an application processor (such as those used in cell phones, smart phones, etc.), or other types of a processor (including a reduced instruction set computer (RISC) processor or a complex instruction set computer (CISC)).

Various types of computer networks 303 may be utilized including wired (e.g., Ethernet, Gigabit, Fiber, etc.) or wireless networks (such as cellular, 3G (Third-Generation Cell-Phone Technology or 3rd Generation Wireless Format (UWCC)), 3G ($4^{th}$ Generation (wireless/mobile communications)), Low Power Embedded (LPE), etc.). Moreover, the processors 302 may have a single or multiple core design. The processors 302 with a multiple core design may integrate different types of processor cores on the same integrated circuit (IC) die. Also, the processors 302 with a multiple core design may be implemented as symmetrical or asymmetrical multiprocessors.

In an embodiment, one or more of the processors 302 may be the same or similar to the processors 102 of FIG. 1. For example, one or more of the processors 302 may include one or more of the cores 106 and/or cache 108. Also, the operations discussed with reference to FIGS. 1-2 may be performed by one or more components of the system 300.

A chipset 306 may also communicate with the interconnection network 304. The chipset 306 may include a graphics and memory control hub (GMCH) 308. The GMCH 308 may include a memory controller 310 (which may be the same or similar to the memory controller 120 of FIG. 1) that communicates with the memory 114. System 300 may also include logic 150 in various locations (such as those shown in FIG. 3 but can be in other locations within system 300 (not shown)). The memory 114 may store data, including sequences of instructions that are executed by the CPU 302, or any other device included in the computing system 300. In one embodiment, the memory 114 may include one or more volatile/non-volatile storage (or memory) devices such as random access memory (RAM), dynamic RAM (DRAM), synchronous DRAM (SDRAM), static RAM (SRAM), or other types of storage devices such as a hard disk, nanowire memory, Ferro-electric transistor random access memory (FeTRAM), magnetoresistive random access memory (MRAM), flash memory, Spin Torque Transfer Random Access Memory (STTRAM), Resistive Random Access Memory, 3D Cross Point Memory such as PCM (Phase Change Memory), a Solid State Drive (SSD) with NAND/NOR memory, etc. Additional devices may communicate via the interconnection network 304, such as multiple CPUs and/or multiple system memories.

The GMCH 308 may also include a graphics interface 314 that communicates with a graphics accelerator 316. In one embodiment, the graphics interface 314 may communicate with the graphics accelerator 316 via an accelerated graphics port (AGP) or Peripheral Component Interconnect (PCI) (or PCI express (PCIe) interface). In an embodiment, a display device 317 (such as a flat panel display, touch screen, etc.) may communicate with the graphics interface 314 through, for example, a signal converter that translates a digital representation of an image stored in a storage device such as video memory or system memory into display signals that are interpreted and displayed by the display. The display signals produced by the display device may pass through various control devices before being interpreted by and subsequently displayed on the display device 317.

A hub interface 318 may allow the GMCH 308 and an input/output control hub (ICH) 320 to communicate. The ICH 320 may provide an interface to I/O devices that communicate with the computing system 300. The ICH 320 may communicate with a bus 322 through a peripheral bridge (or controller) 324, such as a peripheral component interconnect (PCI) bridge, a universal serial bus (USB) controller, or other types of peripheral bridges or controllers. The bridge 324 may provide a data path between the CPU 302 and peripheral devices. Other types of topologies may be utilized. Also, multiple buses may communicate with the ICH 320, e.g., through multiple bridges or controllers. Moreover, peripherals in communication with the ICH 320 may include, in various embodiments, integrated drive electronics (IDE) or small computer system interface (SCSI) hard drive(s), USB port(s), a keyboard, a mouse, parallel port(s), serial port(s), floppy disk drive(s), digital output support (e.g., digital video interface (DVI)), or other devices.

The bus 322 may communicate with an audio device 326, one or more disk drive(s) 328, and a network interface device 330 (which is in communication with the computer network 303, e.g., via a wired or wireless interface). As shown, the network interface device 330 may be coupled to an antenna 331 to wirelessly (e.g., via an Institute of Electrical and Electronics Engineers (IEEE) 802.11 interface (including IEEE 802.11a/b/g/n, etc.), cellular interface, 3G, 3G, LPE, etc.) communicate with the network 303. Other devices may communicate via the bus 322. Also, various components (such as the network interface device 330) may communicate with the GMCH 308 in some embodiments. In addition, the processor 302 and the GMCH 308 may be combined to form a single chip. Furthermore, the graphics accelerator 316 may be included within the GMCH 308 in other embodiments.

Furthermore, the computing system 300 may include volatile and/or nonvolatile memory (or storage). For example, nonvolatile memory may include one or more of the following: read-only memory (ROM), programmable ROM (PROM), erasable PROM (EPROM), electrically EPROM (EEPROM), a disk drive (e.g., 328), a floppy disk, a compact disk ROM (CD-ROM), a digital versatile disk (DVD), flash memory, a magneto-optical disk, or other types of nonvolatile machine-readable media that are capable of storing electronic data (e.g., including instructions).

Figure 4:
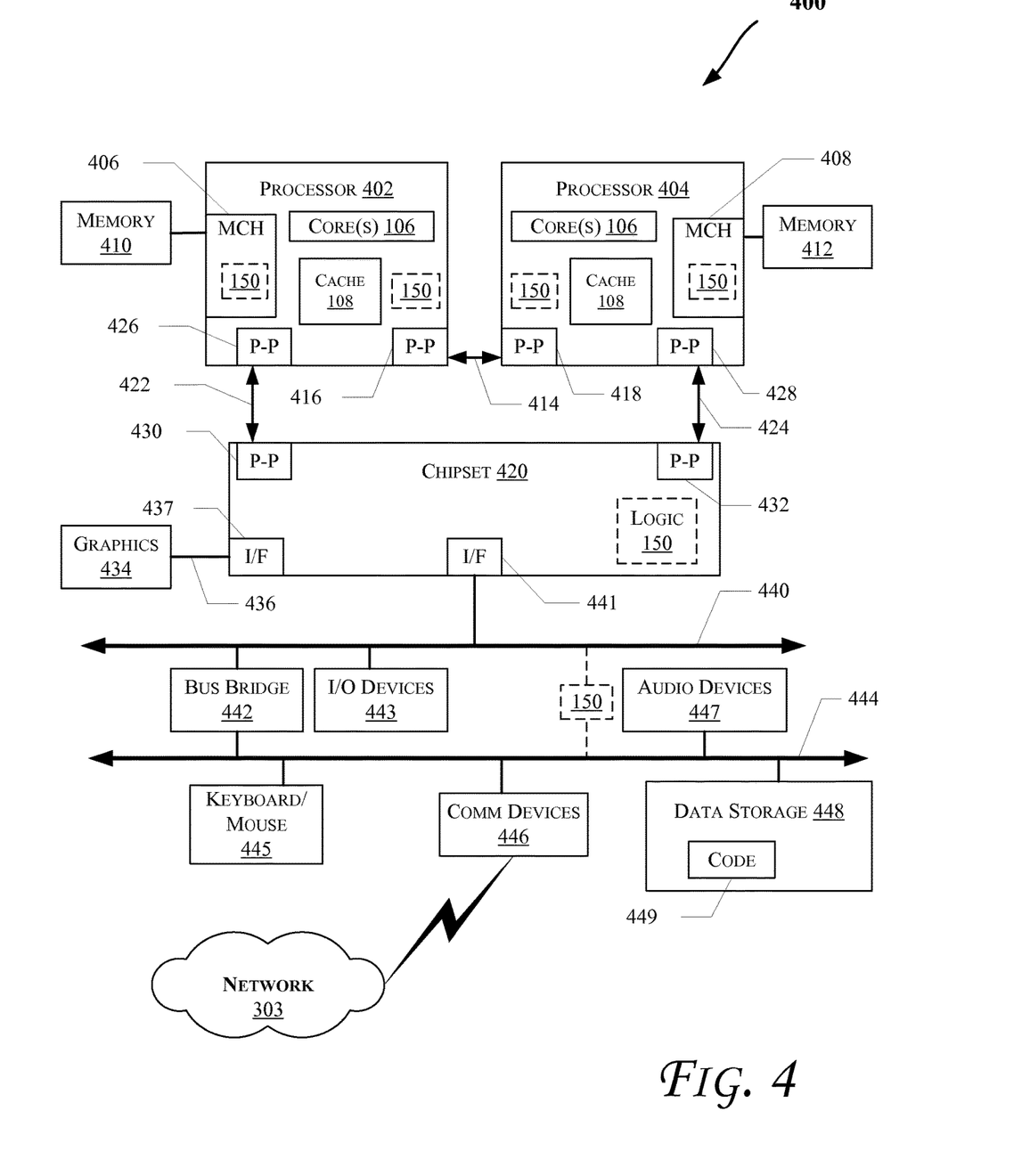

FIG. 4 illustrates a computing system 400 that is arranged in a point-to-point (PtP) configuration, according to an embodiment. In particular, FIG. 4 shows a system where processors, memory, and input/output devices are interconnected by a number of point-to-point interfaces. The operations discussed with reference to FIGS. 1-3 may be performed by one or more components of the system 400.

As illustrated in FIG. 4, the system 400 may include several processors, of which only two, processors 402 and 404 are shown for clarity. The processors 402 and 404 may each include a local memory controller hub (MCH) 406 and 408 to enable communication with memories 410 and 412. The memories 410 and/or 412 may store various data such as those discussed with reference to the memory 114 of FIGS. 1 and/or 3. Also, MCH 406 and 408 may include the memory controller 120 and/or logic 150 of FIGS. 1-3 in some embodiments.

In an embodiment, the processors 402 and 404 may be one of the processors 302 discussed with reference to FIG. 3. The processors 402 and 404 may exchange data via a point-to-point (PtP) interface 414 using PtP interface circuits 416 and 418, respectively. Also, the processors 402 and 404 may each exchange data with a chipset 420 via individual PtP interfaces 422 and 424 using point-to-point interface circuits 426, 428, 430, and 432. The chipset 420 may further exchange data with a high-performance graphics circuit 434 via a high-performance graphics interface 436, e.g., using a PtP interface circuit 437. As discussed with reference to FIG. 3, the graphics interface 436 may be coupled to a display device (e.g., display 317) in some embodiments.

As shown in FIG. 4, one or more of the cores 106 and/or cache 108 of FIG. 1 may be located within the processors 402 and 404. Other embodiments, however, may exist in other circuits, logic units, or devices within the system 400 of FIG. 4. Furthermore, other embodiments may be distributed throughout several circuits, logic units, or devices illustrated in FIG. 4.

The chipset 420 may communicate with a bus 440 using a PtP interface circuit 441. The bus 440 may have one or more devices that communicate with it, such as a bus bridge 442 and I/O devices 443. Via a bus 444, the bus bridge 442 may communicate with other devices such as a keyboard/mouse 445, communication devices 446 (such as modems, network interface devices, or other communication devices that may communicate with the computer network 303, as discussed with reference to network interface device 330 for example, including via antenna 331), audio I/O device, and/or a data storage device 448. The data storage device 448 may store code 449 that may be executed by the processors 402 and/or 404.

Figure 5:
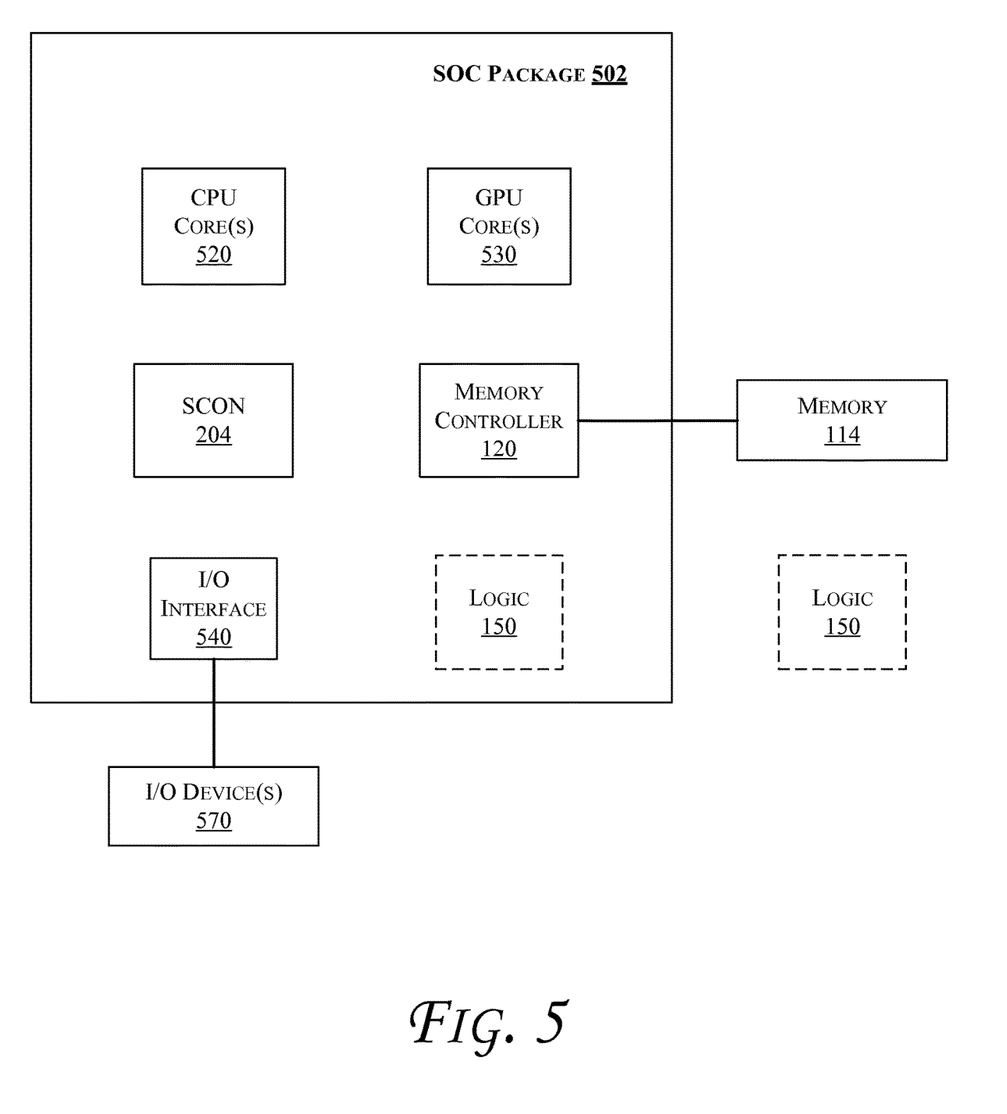

In some embodiments, one or more of the components discussed herein can be embodied on a System On Chip (SOC) device. FIG. 5 illustrates a block diagram of an SOC package in accordance with an embodiment. As illustrated in FIG. 5, SOC 502 includes one or more Central Processing Unit (CPU) cores 520, one or more Graphics Processor Unit (GPU) cores 530, an Input/Output (I/O) interface 540, and the memory controller 120. Various components of the SOC package 502 may be coupled to an interconnect or bus/network, such as SCON 204 discussed herein with reference to the other figures. Also, the SOC package 502 may include more or less components, such as those discussed herein with reference to the other figures. Further, each component of the SOC package 502 may include one or more other components, e.g., as discussed with reference to the other figures herein. In one embodiment, SOC package 502 (and its components) is provided on one or more Integrated Circuit (IC) die, e.g., which are packaged onto a single semiconductor device.

As illustrated in FIG. 5, SOC package 502 is coupled to the main memory 114 (which is external to the SOC package 502) via an interface such as the memory controller 120. In an embodiment, the memory 114 (or a portion of it) can be integrated on the SOC package 502.

The I/O interface 540 may be coupled to one or more I/O devices 570, e.g., via an interconnect and/or bus such as discussed herein with reference to other figures. I/O device(s) 570 may include one or more of a keyboard, a mouse, a touchpad, a display, an image/video capture device (such as a camera or camcorder/video recorder), a touch screen, a speaker, or the like. Furthermore, SOC package 502 may include/integrate the logic 150 in an embodiment. Alternatively, the logic 150 may be provided outside of the SOC package 502 (i.e., as a discrete logic).

The following examples pertain to further embodiments. Example 1 includes an apparatus comprising: detection logic to detect access to a storage location; and configuration logic to cause an access to the storage location, wherein the detection logic is to send a message to a Power Control Unit (PCU) in response to the access to the storage location, wherein the PCU is to respond to the message based at least in part on policy information stored in a storage device. Example 2 includes the apparatus of example 1, wherein the storage location is to comprise one of an address range or a register name space. Example 3 includes the apparatus of example 1, wherein the message is to comprise one or more of an access request or data. Example 4 includes the apparatus of example 1, wherein the PCU and the configuration logic are to agree on the policy information prior to the access. Example 5 includes the apparatus of example 1, wherein the detection logic is to detect access to a plurality of storage locations. Example 6 includes the apparatus of example 5, wherein each of the plurality of storage locations is writable by an agent with a corresponding security access. Example 7 includes the apparatus of example 1, wherein the storage device is to comprise one or more of: memory local to the PCU and an external memory. Example 8 includes the apparatus of example 1, wherein a Memory Management Module (MMU) is to comprise the detection logic. Example 9 includes the apparatus of example 1, wherein the storage location is in virtual address space of the configuration logic. Example 10 includes the apparatus of example 1, wherein a System On Chip (SOC) integrated circuit is to comprise the detection logic and memory. Example 11 includes the apparatus of example 1, wherein one or more of: a processor, having one or more processor cores, the detection logic, the configuration logic, and memory are on a same integrated circuit die.

Example 12 includes a method comprising: detecting access to a storage location; and causing an access to the storage location, wherein a message is transmitted to a Power Control Unit (PCU) in response to the access to the storage location, wherein the PCU responds to the message based at least in part on policy information stored in a storage device. Example 13 includes the method of example 12, wherein detecting access to the storage location comprises detecting access to one of an address range or a register namespace. Example 14 includes the method of example 12, wherein the message comprises one or more of an access request or data. Example 15 includes the method of example 12, further comprising detecting access to a plurality of storage locations. Example 16 includes the method of example 15, wherein each of the plurality of storage locations is writable by an agent with a corresponding security access.

Example 17 includes a computer-readable medium comprising one or more instructions that when executed on a processor configure the processor to perform one or more operations to: detect access to a storage location; and cause an access to the storage location, wherein a message is transmitted to a Power Control Unit (PCU) in response to the access to the storage location, wherein the PCU responds to the message based at least in part on policy information stored in a storage device. Example 18 includes the computer-readable medium of example 17, wherein detecting access to the storage location comprises detecting access to one of an address range or a register namespace. Example 19 includes the computer-readable medium of example 17, wherein the message comprises one or more of an access request or data. Example 20 includes the computer-readable medium of example 17, further comprising one or more instructions that when executed on the processor configure the processor to perform one or more operations to cause detection of access to a plurality of storage locations. Example 21 includes the computer-readable medium of example 20, wherein each of the plurality of storage locations is writable by an agent with a corresponding security access.

Example 22 includes a system comprising: a processor having one or more processors; a display device, coupled to the processor, to display one or more images; detection logic, coupled to the processor, to detect access to a storage location; and configuration logic to cause an access to the storage location, wherein the detection logic is to send a message to a Power Control Unit (PCU) in response to the access to the storage location, wherein the PCU is to respond to the message based at least in part on policy information stored in a storage device. Example 23 includes the system of example 22, wherein the storage location is to comprise one of an address range or a register name space. Example 24 includes the system of example 22, wherein the message is to comprise one or more of an access request or data. Example 25 includes the system of example 22, wherein the PCU and the configuration logic are to agree on the policy information prior to the access.

Example 26 includes an apparatus comprising means to perform a method as set forth in any preceding example.

Example 27 comprises machine-readable storage including machine-readable instructions, when executed, to implement a method or realize an apparatus as set forth in any preceding example.

In various embodiments, the operations discussed herein, e.g., with reference to FIGS. 1-5, may be implemented as hardware (e.g., circuitry), software, firmware, microcode, or combinations thereof, which may be provided as a computer program product, e.g., including a tangible (e.g., non-transitory) machine-readable or computer-readable medium having stored thereon instructions (or software procedures) used to program a computer to perform a process discussed herein. Also, the term "logic" may include, by way of example, software, hardware, or combinations of software and hardware. The machine-readable medium may include a storage device such as those discussed with respect to FIGS. 1-5.

Additionally, such tangible computer-readable media may be downloaded as a computer program product, wherein the program may be transferred from a remote computer (e.g., a server) to a requesting computer (e.g., a client) by way of data signals (such as in a carrier wave or other propagation medium) via a communication link (e.g., a bus, a modem, or a network connection).

Reference in the specification to "one embodiment" or "an embodiment" means that a particular feature, structure, or characteristic described in connection with the embodiment may be included in at least an implementation. The appearances of the phrase "in one embodiment" in various places in the specification may or may not be all referring to the same embodiment.

Also, in the description and claims, the terms "coupled" and "connected," along with their derivatives, may be used. In some embodiments, "connected" may be used to indicate that two or more elements are in direct physical or electrical contact with each other. "Coupled" may mean that two or more elements are in direct physical or electrical contact. However, "coupled" may also mean that two or more elements may not be in direct contact with each other, but may still cooperate or interact with each other.

Thus, although embodiments have been described in language specific to structural features and/or methodological acts, it is to be understood that claimed subject matter may not be limited to the specific features or acts described. Rather, the specific features and acts are disclosed as sample forms of implementing the claimed subject matter.

The invention claimed is:

1. An apparatus comprising:
    a processor comprising at least one processor core, wherein the at least one processor core is to execute software to access a first reserved address range or a second reserved address range;
    detection logic to detect access to any of the first reserved address range or a second reserved address range by the software; and
    configuration logic to cause an access to the first reserved address range or the second reserved address range, wherein the detection logic is to send a message to a Power Control Unit (PCU) in response to the access to the first reserved address range or the second reserved address range by the software,
    wherein the PCU is to respond to the message based at least in part on policy information stored in the first reserved address range or second reserved address range, wherein the PCU is to comprise hardware logic separate from the processor, wherein the first reserved address range is writable by a first agent with a first security access and the second reserved address range is writable by a second agent with a second security access, wherein the processor comprises a plurality of processor cores, wherein the policy information comprises a Running Average Power Limit (RAPL) policy for each of the plurality of processor cores.

2. The apparatus of claim 1, wherein the first reserved address range or second reserved address range comprises an address range in a virtual address space associated with the at least one processor core.

3. The apparatus of claim 1, wherein the message is to comprise one or more of an access request or data.

4. The apparatus of claim 1, wherein the PCU and the configuration logic are to agree on the policy information prior to the access.

5. The apparatus of claim 1, wherein the detection logic is to detect access to a plurality of storage locations comprising the policy information stored in the first reserved address range or second reserved address range.

6. The apparatus of claim 5, wherein each of the plurality of storage locations is writable by an agent with a corresponding security access.

7. The apparatus of claim 1, wherein the policy information is further stored on a storage device, wherein the storage device is to comprise one or more of: memory local to the PCU and an external memory.

8. The apparatus of claim 1, wherein a Memory Management Module (MMU) is to comprise the detection logic.

9. The apparatus of claim 5, wherein at least one of the plurality of storage locations is in virtual address space of the configuration logic.

10. The apparatus of claim 1, wherein a System On Chip (SOC) integrated circuit is to comprise the detection logic and memory.

11. The apparatus of claim 1, wherein one or more of: the processor, the detection logic, the configuration logic, and memory are on a same integrated circuit die.

12. The apparatus of claim 1, wherein the first security access corresponds to a ring 0 access and the second security access corresponds to ring 3 access.

13. A method comprising:
    configuring a first address range or a second address range containing policy information to be accessed by software, wherein the software is executed on a processor core;
    detecting access by the software to the first address range or second address range;
    transmitting a message to a Power Control Unit (PCU) in response to the access to the first address range or second address range; and
    receiving a reply message from the PCU to the software, wherein the PCU responds to the message based at least in part on the policy information stored in the first address range or second address range, wherein the PCU comprises hardware logic separate from a processor that is to include the processor core, wherein the first reserved address range is writable by a first agent with a first security access and the second reserved address range is writable by a second agent with a second security access, wherein the processor comprises a plurality of processor cores, wherein the policy information comprises a Running Average Power Limit (RAPL) policy for each of the plurality of processor cores.

14. The method of claim 13, wherein detecting access by the software to the first address range or second address range comprises detecting access to one of a virtual address range or a register namespace.

15. The method of claim 13, wherein the message comprises one or more of an access request or data.

16. The method of claim 13, further comprising detecting access to a plurality of storage locations comprising the policy information stored in the first address range or second address range.

17. The method of claim 16, wherein each of the plurality of storage locations is writable by an agent with a corresponding security access.

18. A computer-readable medium comprising one or more instructions that when executed on a processor configure the processor to perform one or more operations to:
detect access by software to a first reserved address range or a second reserved address range, wherein a processor core of the processor is to execute the software; and
cause an access to the first reserved address range or second reserved address range, wherein a message is transmitted by a hardware agent to a Power Control Unit (PCU) in response to the access,
wherein the PCU responds to the message based at least in part on policy information stored in a storage device, wherein the PCU is to comprise hardware logic separate from the processor, wherein the first reserved address range is writable by a first agent with a first security access and the second reserved address range is writable by a second agent with a second security access, wherein the processor comprises a plurality of processor cores, wherein the policy information comprises a Running Average Power Limit (RAPL) policy for each of the plurality of processor cores.

19. The computer-readable medium of claim 18, wherein detecting access to the first reserved address range or second reserved address range comprises one of a memory management unit or a memory controller detecting access to the first reserved address range or second reserved address range.

20. The computer-readable medium of claim 18, wherein the message comprises one or more of an access request or data.

21. The computer-readable medium of claim 18, further comprising one or more instructions that when executed on the processor configure the processor to perform one or more operations to cause detection of access to a plurality of storage locations.

22. The computer-readable medium of claim 21, wherein each of the plurality of storage locations is writable by an agent with a corresponding security access.

23. A system comprising:
a processor having one or more cores, wherein at least one core of the one or more cores corresponds to first address range or second address ranges reserved for policy information;
a display device, coupled to the processor, to display one or more images;
detection logic, coupled to the processor, to detect access to the first address range or second address range by software, wherein the at least one core is to execute the software to access the first address range or second address range; and
configuration logic to cause an access to the first address range or second address range, wherein the detection logic is to send a message to a Power Control Unit (PCU) in response to the access to the first address range or second address range,
wherein the PCU is to respond to the message based at least in part on policy information stored in a storage device comprising the policy information, wherein the PCU is to comprise hardware logic separate from the processor, wherein the first reserved address range is writable by a first agent with a first security access and the second reserved address range is writable by a second agent with a second security access, wherein the processor comprises a plurality of processor cores, wherein the policy information comprises a Running Average Power Limit (RAPL) policy for each of the plurality of processor cores.

24. The system of claim 23, wherein the first address range or second address range is to comprise virtual address space associated with the at least one core.

25. The system of claim 23, wherein the message is to comprise one or more of an access request or data.

26. The system of claim 23, wherein the PCU and the configuration logic are to agree on the policy information prior to the access, and wherein the PCU is to run firmware to read policy settings supplied by the at least one core software.

* * * * *